United States Patent
Gilstring (10) Patent No.: US 9,901,023 B2
(45) Date of Patent: Feb. 27, 2018

(54) SEPARATOR AND METHOD OF SEPARATING GRANULAR MATERIAL IN AN AGRICULTURAL IMPLEMENT

(71) Applicant: Vaderstad-Verken AB, Vaderstad (SE)

(72) Inventor: Gert Gilstring, Vadstena (SE)

(73) Assignee: VADERSTAD-VERKEN AB (SE)

( * ) Notice: Subject to any disclaimer, the term of this patent is extended or adjusted under 35 U.S.C. 154(b) by 181 days.

(21) Appl. No.: 14/404,735

(22) PCT Filed: Mar. 14, 2013

(86) PCT No.: PCT/SE2013/050255
§ 371 (c)(1),
(2) Date: Dec. 1, 2014

(87) PCT Pub. No.: WO2013/180620
PCT Pub. Date: Dec. 5, 2013

(65) Prior Publication Data
US 2015/0189828 A1    Jul. 9, 2015

(30) Foreign Application Priority Data
May 31, 2012 (SE) ..................... 1250565

(51) Int. Cl.
*A01C 7/08* (2006.01)
*A47L 9/16* (2006.01)
(Continued)

(52) U.S. Cl.
CPC .............. *A01C 7/084* (2013.01); *A01C 7/081* (2013.01); *A01C 7/082* (2013.01); *A01C 21/00* (2013.01);
(Continued)

(58) Field of Classification Search
USPC ................ D23/365; 406/168, 171, 172, 175; 55/307, 398
See application file for complete search history.

(56) References Cited

U.S. PATENT DOCUMENTS 1,389,231 A * 8/1921 Walker ...................... B07B 1/12
                                                          209/352
2,498,190 A * 2/1950 Weeks ..................... F02M 1/00
                                                          48/189.4
(Continued)

FOREIGN PATENT DOCUMENTS

DE           3739186      6/1989
DE           68904879     2/1993
(Continued)

*Primary Examiner* — Alicia Torres
(74) *Attorney, Agent, or Firm* — Hayes Soloway PC (57) ABSTRACT

A separator for separating granular material, such as seed, fertilizer or pesticide, from a material-laden airflow (FI) includes a separator zone (Z) having an inlet (11) for a material-laden airflow, a material outlet (13) and an air outlet (12, 12'), and at least two separator parts (15, 15'), which extend only substantially along a material flow (FM) in the separator zone (Z) and between which is formed a separator gap (12, 12'), which is sufficiently narrow to allow air, but not the granular material, to pass through it. At the material outlet (13), the separator gap (12, 12') is at least partially open, viewed in a direction which is substantially parallel with the material flow (FM), so that material which gets stuck in the separator gap (12, 12') is allowed to leave this by means of displacement principally along the material flow (FM).

15 Claims, 6 Drawing Sheets

(51) Int. Cl.
*A47L 9/12* (2006.01)
*B07B 7/00* (2006.01)
*B07B 4/02* (2006.01)
*A01C 21/00* (2006.01)
*B65G 53/06* (2006.01)

(52) U.S. Cl.
CPC ............. *A47L 9/127* (2013.01); *A47L 9/1666* (2013.01); *A47L 9/1683* (2013.01); *B07B 4/02* (2013.01); *B07B 7/00* (2013.01); *B65G 53/06* (2013.01)

(56) References Cited

U.S. PATENT DOCUMENTS

| | | | |
|---|---|---|---|
| 2,777,576 A | | 1/1957 | Stevenson |
| 3,006,470 A | | 10/1961 | Franken |
| 3,888,387 A | | 6/1975 | Deckler |
| 3,942,561 A | * | 3/1976 | Stoeffler ............... B65B 1/16 141/376 |
| 3,964,639 A | * | 6/1976 | Norris ................ A01C 7/082 111/176 |
| 4,060,181 A | | 11/1977 | Grataloup |
| 4,450,979 A | | 5/1984 | Deckler |
| 5,156,102 A | | 10/1992 | Anderson |
| 5,161,473 A | | 11/1992 | Landphair et al. |
| 5,379,706 A | | 1/1995 | Gage et al. |
| 5,392,722 A | | 2/1995 | Snipes et al. |
| 5,406,897 A | | 4/1995 | Pingry |
| 5,411,152 A | * | 5/1995 | Matthews ............ B07B 13/072 209/668 |
| 5,593,043 A | * | 1/1997 | Ozmerih ............... B01D 45/14 209/22 |
| 5,915,312 A | | 6/1999 | Meyer et al. |
| 6,047,652 A | | 4/2000 | Prairie et al. |
| 6,164,222 A | | 12/2000 | Mayerle et al. |
| 6,253,693 B1 | | 7/2001 | Mayerle et al. |
| 6,267,067 B1 | | 7/2001 | Mayerle et al. |
| 6,298,797 B1 | | 10/2001 | Mayerle et al. |
| 6,505,569 B1 | * | 1/2003 | Richard ................ A01C 7/042 111/174 |
| 6,581,533 B1 | | 6/2003 | Hagen et al. |
| 6,609,468 B1 | | 8/2003 | Meyer et al. |
| 6,935,255 B2 | | 8/2005 | Hagen et al. |
| 6,935,256 B1 | | 8/2005 | Meyer |
| 7,017,502 B2 | | 3/2006 | Quam et al. |
| 7,086,342 B2 | | 8/2006 | O'Neall et al. |
| 7,104,204 B2 | | 9/2006 | McCartney |
| 7,779,770 B2 | | 8/2010 | Sauder et al. |
| 7,938,072 B2 | * | 5/2011 | Wilhelmi ............... A01C 7/081 111/174 |
| 7,966,954 B2 | | 6/2011 | Anderson et al. |
| 8,677,915 B2 | * | 3/2014 | Riggs ................. A01B 79/005 111/171 |
| 2003/0177966 A1 | | 9/2003 | Lee et al. |
| 2005/0028714 A1 | | 2/2005 | Hagen et al. |
| 2005/0235889 A1 | | 10/2005 | Martin et al. |
| 2010/0107945 A1 | | 5/2010 | Beaujot |
| 2010/0122644 A1 | | 5/2010 | Memory |
| 2010/0300341 A1 | * | 12/2010 | Peterson ............... A01C 7/046 111/185 |
| 2010/0313801 A1 | | 12/2010 | Peterson et al. |
| 2011/0162566 A1 | | 7/2011 | Wilhelmi et al. |
| 2012/0227647 A1 | * | 9/2012 | Gelinske ............... G01F 1/666 111/174 |

FOREIGN PATENT DOCUMENTS

| | | | | |
|---|---|---|---|---|
| DE | 102010016389 | | 10/2011 | |
| EP | 1504642 A1 | | 2/2005 | |
| EP | 1591000 | | 2/2005 | |
| EP | 2044827 A2 | | 4/2009 | |
| EP | 2497349 A1 | | 9/2012 | |
| EP | 2260688 B1 | | 10/2012 | |
| FR | 2258087 A7 | * | 8/1975 | ............ A47L 5/365 |
| GB | 899449 | | 6/1962 | |
| KR | 20040103068 A | * | 12/2004 | ............ A47L 9/102 |
| RU | 2186636 | | 10/2002 | |
| RU | 2401704 | | 10/2010 | |
| RU | 2447953 | | 4/2012 | |
| SE | 534518 | | 5/2011 | |
| SE | 534736 | | 5/2011 | |
| WO | 2010141627 A2 | | 12/2010 | |
| WO | 2011056123 | | 5/2011 | |

* cited by examiner

SEPARATOR AND METHOD OF SEPARATING GRANULAR MATERIAL IN AN AGRICULTURAL IMPLEMENT

TECHNICAL FIELD

The present document relates to a separator for separating granular material from an air stream in a so called "nursing-system" or "product-on-demand-system" in an agricultural implement, such as a seed drill, a precision seed drill, a fertilizer spreader or a pesticide spreader. The document also relates to a metering device comprising such a separator, to an agricultural implement comprising such a metering device, and to a method for, in an agricultural implement, separating granular material.

BACKGROUND

It is known to provide seed drills in which a central seed container is arranged to feed seed to a plurality of row units, each of which comprises a measuring device for controlling the dispensed quantity of seed for the attainment of a predefined mutual spacing between seedlings belonging to the respective row. Each such row unit can comprise a respective distributed seed container, connected to a metering device, and the central seed container is arranged to feed seed to the distributed seed container.

The feed from the central seed container to the distributed seed container can be realized with the aid of an air stream, which is produced with the aid of an overpressure at the central seed container.

In order to separate the seed from the air stream, there is a need for a separator which has the capacity to effectively separate seed from the air stream and which has high operating reliability. It is especially desirable to provide a separator which has the capacity to effectively separate seed without being clogged by impurities, such as seed coats, dust, parts of damaged seeds, plant residues, clumps of mordant, parts of seed bags, or other material which can be present in the environment in question.

SUMMARY

One object is thus to provide a separator and a separation method which eliminate or reduce the problems with the prior art.

The invention is defined by the appended independent patent claims. Non-limiting embodiments emerge from the dependent patent claims, the appended drawings and the following description.

According to a first aspect, a separator for separating granular material, such as seed, fertilizer or pesticide, from a material-laden airflow is provided. The separator comprises a separator zone having an inlet for a material-laden airflow, a material outlet and an air outlet; and at least two separator parts, which extend only substantially along a material flow in the separator zone and between which is formed a separator gap, which is sufficiently narrow to allow air, but not the granular material, to pass through it. At the material outlet, the separator gap is at least partially open, viewed in a direction which is substantially parallel with the material flow, so that material which gets stuck in the separator gap is allowed to leave this by means of displacement principally along the material flow. The risk of material clogging the separator gap is hereby reduced.

A distance between the separator parts can increase along the material flow and/or along an air outlet flow.

The fact that the separator comprises separator parts which extend only along the material flow and have increasing gap widths reduces the risk of material getting stuck in the gap and thereby impairing the working of the separator.

The separator parts can comprise a plurality of ribs extending along the material flow.

The separator can have a plurality of separator gaps, which are distributed radially around at least a part of the separator zone.

The separator can comprise a base part situated at the material outlet and having a material outlet opening, the separator parts connecting to the edge of the material outlet opening at a greater radial distance from the centre of the opening than that at which the separator parts connect to the edge of an inlet opening.

The risk of material clogging the gap is thus reduced further. In addition, production of the separator by casting or injection moulding is facilitated.

The separator parts can span a substantially cylindrical, frustoconical, prism-shaped or frustum-shaped inner face.

The separator parts can connect to the edge of the material outlet opening via a substantially radially extending spacer portion.

The base part can have an axially continuous recess, which substantially coincides with the separator gap and extends radially beyond an inner face of the separator parts, and preferably past an outer face of the separator parts.

The inlet can be situated at a higher vertical level than the material outlet.

According to a second aspect, a metering device for metering and dispensing granular material, such as seed, fertilizer or pesticide, is provided. The metering device can comprise a singling device configured to produce a flow of individual granules from the granular material, in which flow the granules are fed at a predefined mutual spacing; and a material inlet for feed-in of the granular material to the singling device. A separator according to that which has been described above is arranged such that its inlet is connected to a feed duct for feeding a material-laden airflow and such that its material outlet is connected to the material inlet.

The air outlet of the separator can be connected to a duct for pressurization of the singling device, so that airflow from the separator is connected to an air inlet of the metering device.

The air inlet and the material inlet can be connected to the metering device on a high-pressure side of a singling disc.

According to a third aspect, an agricultural implement for spreading granular material, such as seed, fertilizer or pesticide, is provided, comprising a central container for the granular material; at least two metering devices according to that which has been described above; and at least two feed ducts for feeding the granular material from the central container to the respective metering device.

According to a fourth aspect, a method for, in an agricultural implement, separating granular material, such as seed, fertilizer or pesticide, from a material-laden air stream is provided. The method comprises introducing the material-laden air stream into a separator zone, passing the granular material through the separator zone along a separator gap which, at a material outlet, is at least partially open in a direction which is substantially parallel with a material flow, so that material which gets stuck in the separator gap is allowed to leave this by means of displacement principally along the separator gap, and feeding the granular material separated from the material-laden air stream to a metering device.

DESCRIPTION OF EMBODIMENTS

Figure 1:
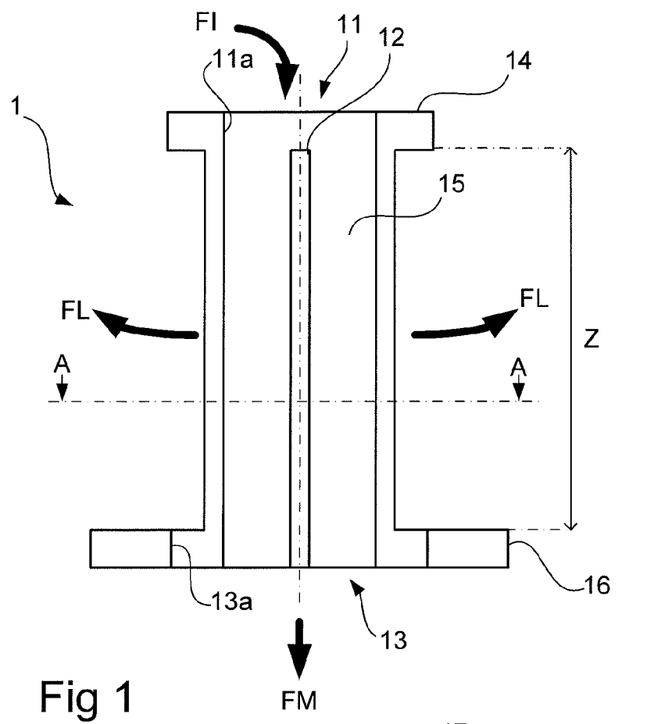
FIG. 1 is a schematic sectional view of a separator according to one embodiment.
Figure 2:
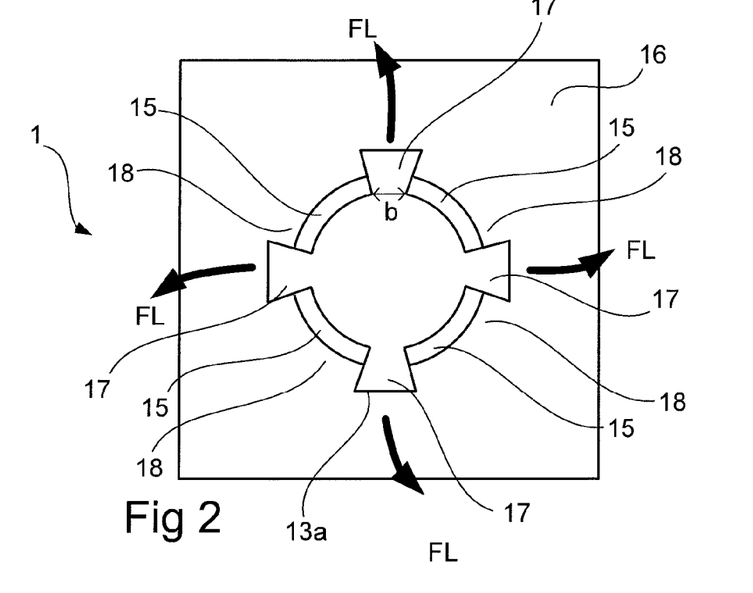
FIG. 2 is a schematic sectional view along the line A-A in FIG. 1.

FIGS. 1 and 2 show in schematic representation a separator 1, which has an inlet 11, a plurality of air outlets and a material outlet 13. The inlet 11 can be surrounded by an inlet flange 14 and the material outlet 13 can be surrounded by an outlet flange 16. The air outlets are formed by gaps 12 between separator parts 15.

The separator parts 15 can together define a geometric body, which extends between the inlet and the material outlet. The inlet 11 and the material outlet 13 can be substantially concentrically aligned with each other, so that a separator zone Z extends substantially linearly between the inlet 11 and the material outlet 13, and so that openings to the inlet 11 and the material outlet 13 define substantially parallel planes.

The separator zone can in this case be substantially cylindrical or frustoconical with, for example, circular, oval or elliptical cross section. Alternatively, the body can have a prismatic shape or the shape of a frustum, for example with square or rectangular cross section. Other cross sections having, for example, the shape of a polygon, trapezoid, etc. are conceivable.

Alternatively, openings to the inlet 11 and the material outlet 13 can define non-parallel planes. In such cases, the separator zone Z can extend linearly or in a curved path between the inlet 11 and the material outlet 13. The separator zone can thus define a body which has the form of a curved pipe with cross section according to that which has been stated above for the separator zone Z.

In the example shown in FIGS. 1-2, the separator zone has the form of a right-angled cylinder with circular cross section.

The inlet flange 14 and the material outlet flange 16 can be adapted to the space in which the separator is to be placed, for example in order to form a seal against walls which form the space. In the example shown in FIGS. 1-2, the material outlet flange 16 has a square shape and the material inlet flange has a circular cross section.

Between the separator parts 15 are formed gaps 12, through which air (and small particles), but not the material to be separated from the airflow, can pass. The separator gap should thus have a, at its inner face, maximum width which is less than a minimum diameter of the granular material to be separated. The separator can be configured as an exchangeable part, which is chosen from amongst a plurality of like components with, for example, different gap width, in order to suit the type of granular material which is to be fed and separated.

The gap width b can be increasing outwards in the radial direction, i.e. in a direction substantially parallel with the outlet airflow FL. The gap 12 can, for example, have a width b which is larger at the outward-facing face of the separator part 15 than at the inward-facing face of the separator part 15. This can be realized, for example, by the separator parts having a cross section, viewed, for example, in the plane A-A, perpendicular to the material flow FM, which is outwardly tapering, for example triangular, trapezoidal, semi-circular, etc.

At the material outlet 13, the separator gap 12, 12' can be open in a direction substantially parallel with the material flow FM. The result is that material stuck in the separator gap 12, 12' can be conducted by the material flow FM towards the material outlet 13 and, when reaching the end of the separator gap 12, 12', comes loose and is conducted onward with the material flow FM.

According to one embodiment, the material outlet 13 can be configured with an edge 13a facing towards the opening. The separator parts 15 can connect to the edge 13a via spacer portions 18. Tangentially between the spacer portions 18, a number of axially continuous recesses 18 can be formed in the material outlet flange 16. The recesses 18 can coincide with the gaps 12, so that the openings formed by the gap continue radially outwards in the material outlet flange 16.

The separator parts 18 can thus connect to the edge portion 13a of the material outlet 13 at a larger radius than that at which the ribs connect to the edge portion 11a of the material inlet 11.

Alternatively, the separator gap 12 can continue axially through the material outlet flange, implying that a radial depression with a depth corresponding to the radial wall thickness of the separator parts 18 is produced in the edge 13a. The depth of the radial depression can be, for example, 20%-100% of the radial wall thickness.

The gap width b can also be increasing in the axial direction towards the material outlet 13, i.e. in a direction substantially parallel with the material flow FM. This can be realized by the separator parts being downwardly tapering and/or by the whole of the body which is spanned by the separator parts being conical.

Figure 3:
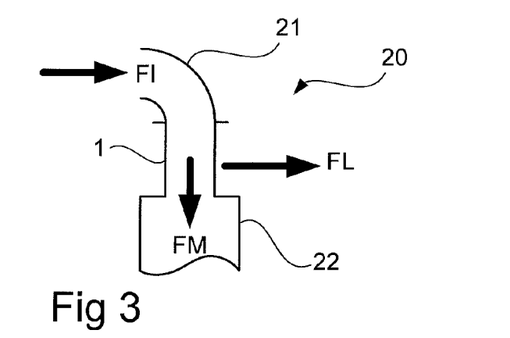
FIG. 3 is a schematic sectional view of a first system in which the separator which is described herein can be used.

In FIG. 3 is shown a system 20 in which the herein shown separator can be used. The system comprises an inlet duct 21, in which a material-laden air flow FI from, for example, a central container can be fed, and a container 22, in which separated material can be collected, for example for onward feeding with the aid of a metering device (FIGS. 7-8), which can have the form of a singling device. Between the inlet duct 21 and the container 22 is arranged the separator 1. In this embodiment, the separator is arranged such that airflow FL flowing out from this is released to the environment.

Figure 4A:
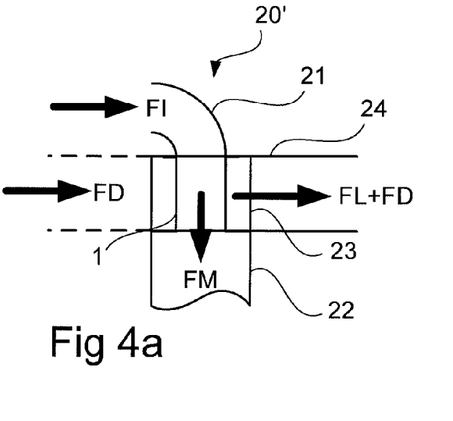
FIGS. 4a-4b are schematic sectional views of a second system in which the separator which is described herein can be used.
Figure 4B:
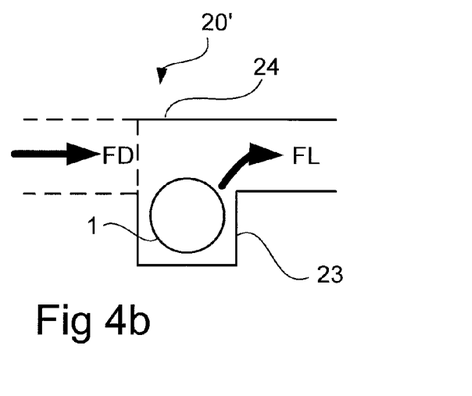

In FIGS. 4a-4b is shown another system 20', in which the herein shown separator 1 can be used. This system 20' comprises, apart from the parts in FIG. 3, also a separator chamber 23, which encloses the separator, and a waste air duct 24, which is connected to the separator chamber 23 and enables the utilization of air FL flowing out from the separator, and of therewith associated air pressure. The waste air duct 24 can also prevent the air FL from the inlet duct 21 from being released to the environment, by virtue of the fact that the air is instead recycled, for example, to feed material from the metering device.

As indicated by the dashed lines in FIGS. 4a and 4b, the airflow FL from the separator 1 can, for example, be led to a drive air duct which supplies the metering device with a drive airflow FD.

Figure 5:
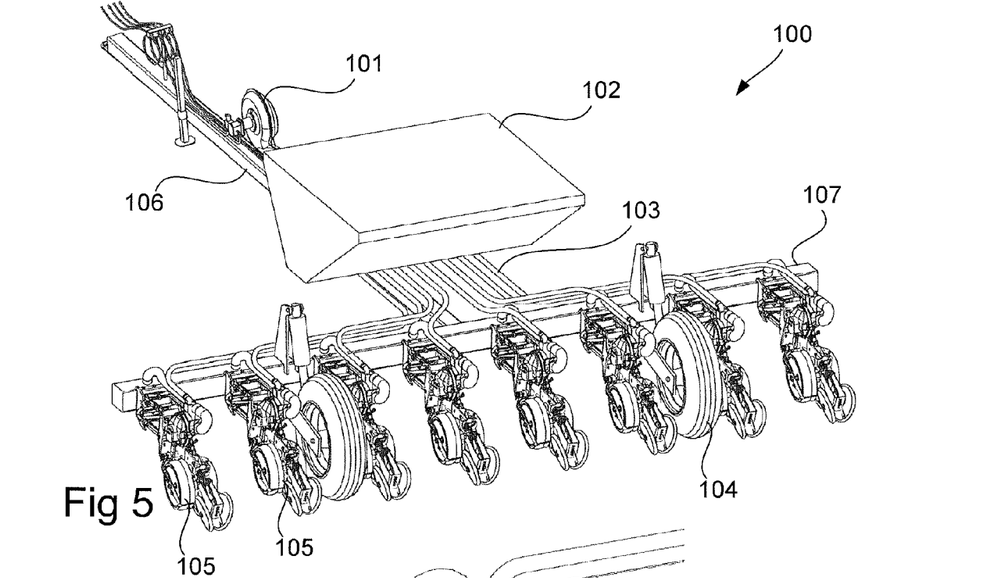
FIG. 5 is a schematic perspective view of an agricultural implement 100.

FIG. 5 shows an agricultural implement 100 in the form of a precision drill. The agricultural implement comprises a frame 106, 107, which supports a central seed container 102 from which seed is driven with the aid of a blower 101 via feed ducts 103 to a plurality of (here eight) row units 105. The agricultural implement 100 also has a pair of supporting wheels 104, which can be used as support for the agricultural implement 100 during sowing and which can be height-adjustable so as also to be able to constitute transport support in road transport.

Figure 6:
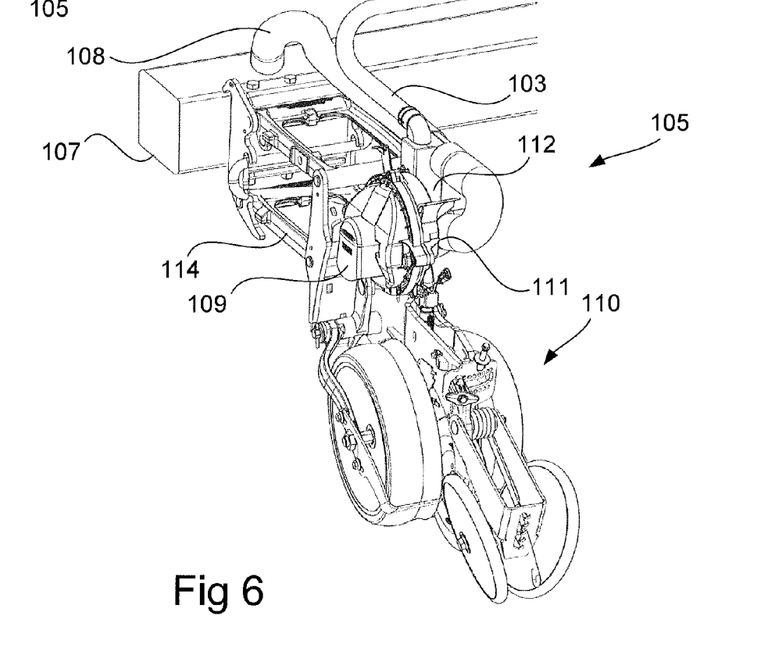
FIG. 6 is a schematic perspective view of a row unit 105.

FIG. 6 shows a row unit 105 of the agricultural implement 100 in FIG. 5 and, more specifically, the row unit furthest to the left in FIG. 5.

The row unit 105 can be attached to a transverse part 107 of the frame of the agricultural implement 100. A height-adjusting mechanism 114 supports a metering device 109, as well as a sowing device 110. The metering device 109 is fed via an air duct 108 with an airflow FD, which can pressurize the metering device and possibly also be used to dispense the seed from the metering device. The airflow FD can be produced with the aid of the blower 101 or with the aid of a separate blower. Via a feed duct 103, the metering device 109 is fed with an airflow FI mixed with seed.

A separator unit 112 is arranged to separate from the airflow FI the seed entering the feed duct 103.

From the separator unit 112, outgoing air is returned to the drive air duct 108 and fed together with the drive airflow FD via a drive air inlet 111 to the metering device 109.

Figure 7:
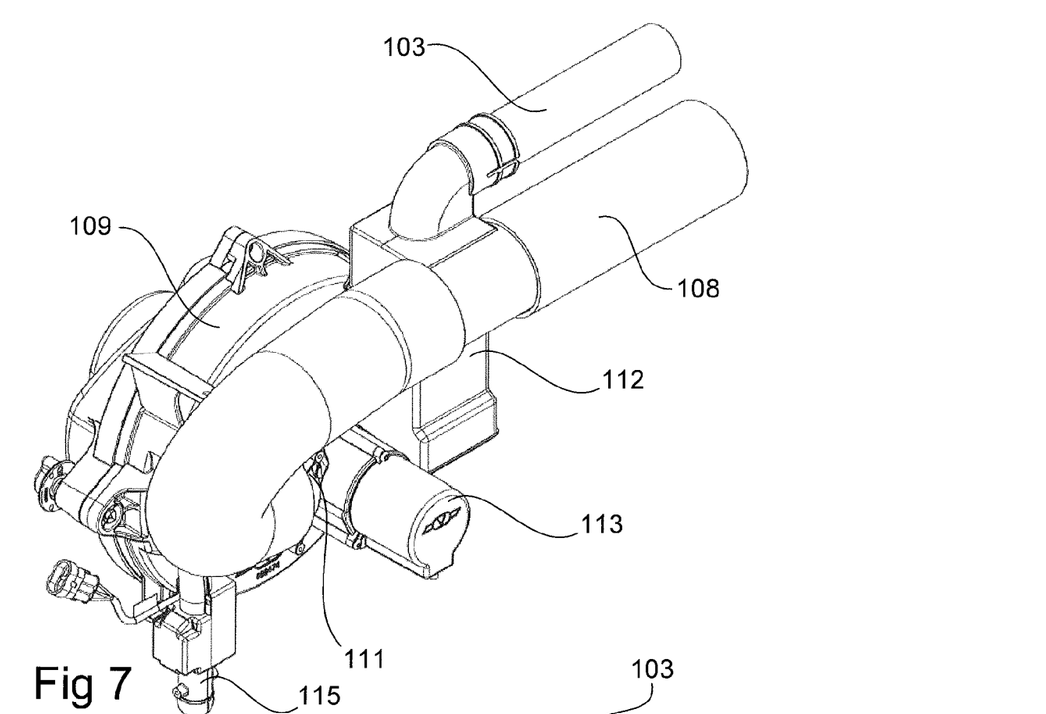
FIG. 7 is a schematic perspective view of a metering device 109 with an integrated separator unit 112.

FIG. 7 shows a perspective view of the metering device 109 and of ducts which run into this same, inclusive of the drive air inlet 111, the feed duct 103 and the drive air duct 108. In FIG. 7 can also be seen a casing 113 for the motor (for example an electric motor) which drives a singling device 116 in the metering device 109. The seed outlet 115, via which seed is fed from the metering device 109 to the sowing device 110, can also be seen.

Figure 8:
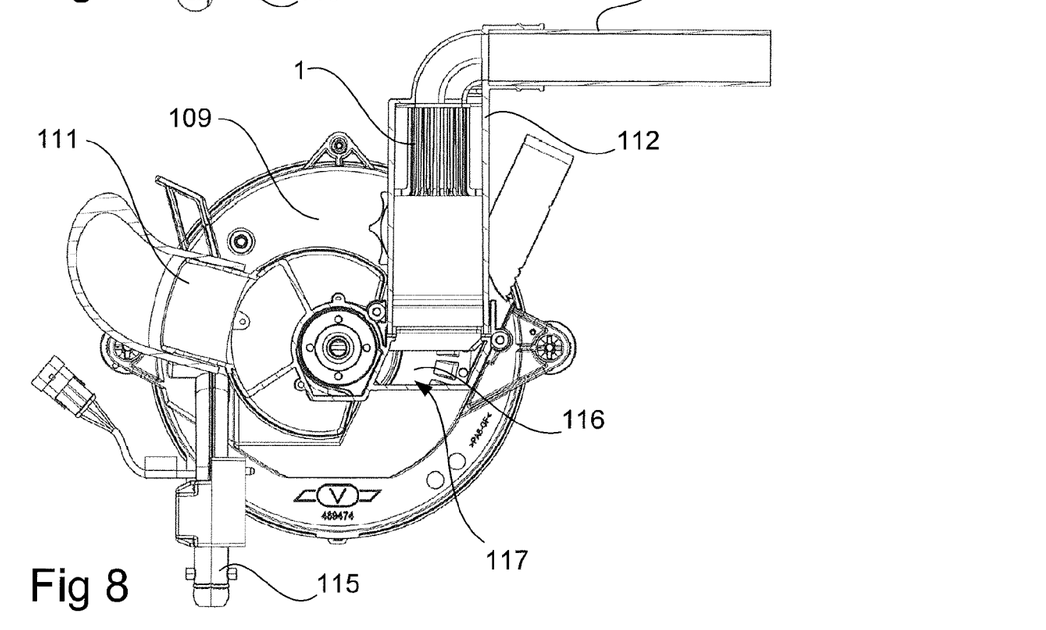
FIG. 8 is a sectional view of the metering device in FIG. 7.
Figure 9A:
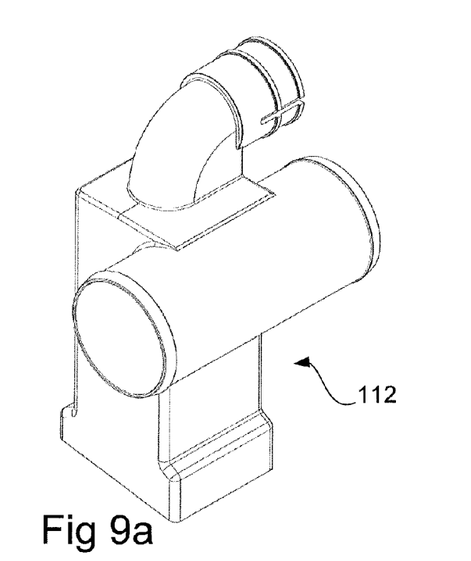
FIGS. 9a-9d are schematic views of a separator unit.
Figure 9B:
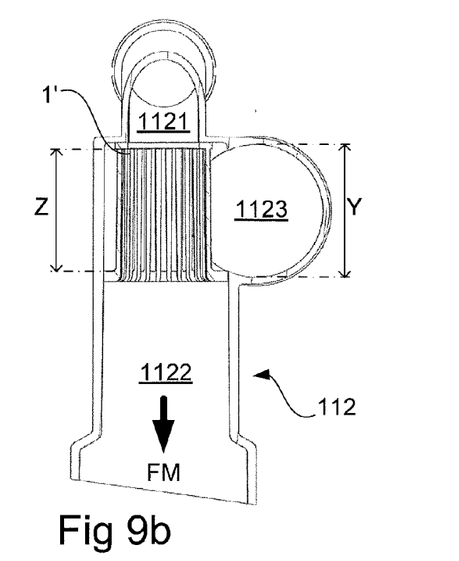
Figure 9C:
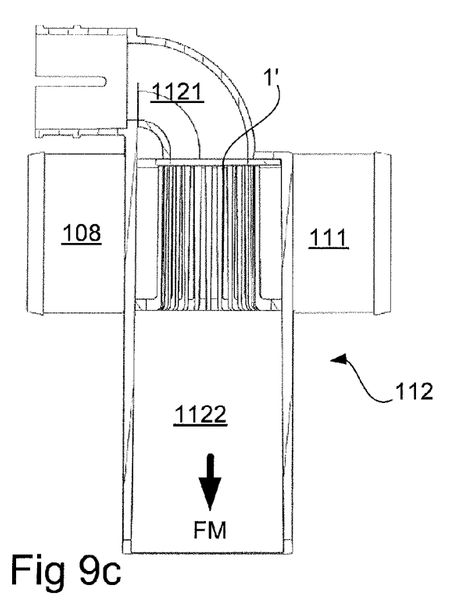
Figure 9D:
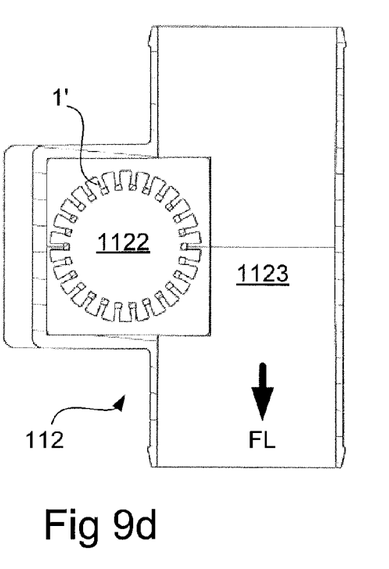
Figure 10A:
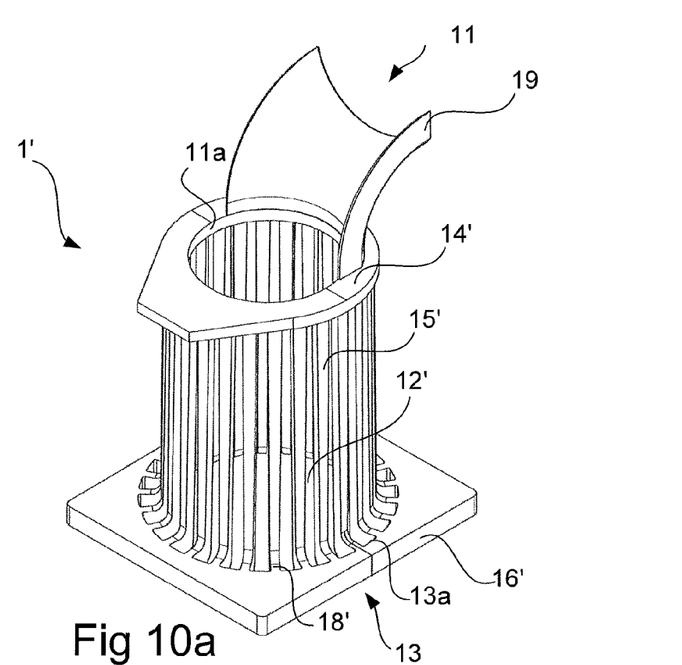
FIGS. 10a-10b show further views of the separator unit in FIGS. 9a-9d.
Figure 10B:
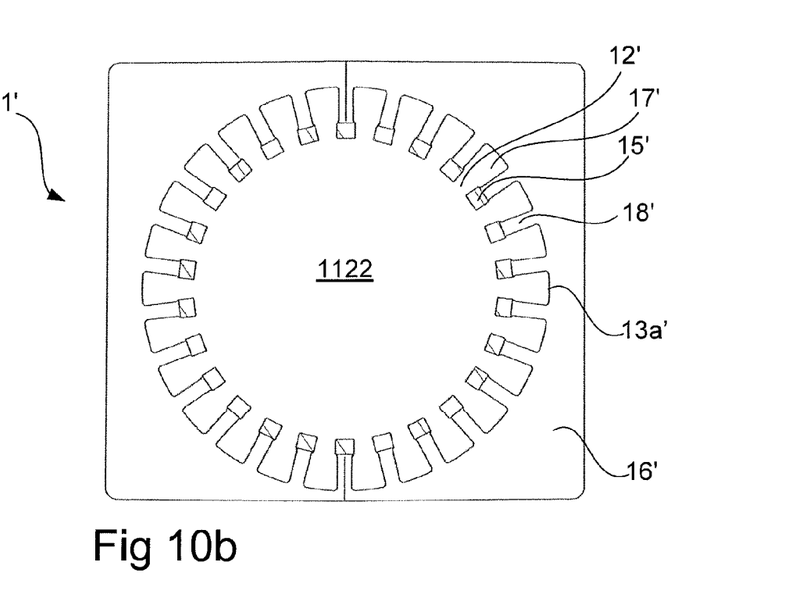

In FIG. 8 is shown a sectional view of the metering device 109. The separator unit 112 is here shown in sectioned view. The metering device 109 has a material inlet 117 and it can be seen how the material outlet space 1122 in the lower portion of the separator unit 112 is open towards a space in the metering device 109 in which a singling disc 116 is rotatable and in which a positive air pressure from the drive air inlet 111 is present. The material outlet space 1122 of the separator unit 109 is open towards the space containing positive air pressure, so that the seed is fed to the singling disc 116 with the aid of gravitational force.

In FIGS. 9a-9d and 10a-10b is shown an embodiment of the separator unit 112. The separator unit 112 comprises a casing enclosing an inlet space 1121, a material outlet space 1122 and an air outlet space 1123. A separator 1' is arranged to form a separator zone Z in the interface between the inlet space, the material outlet space 1122 and the air outlet space.

The material outlet space 1122 is situated at a lower vertical level than the separator zone Z, so that material separated from incoming material-laden airflow is conducted via the material outlet space 1122 to the metering device 109 with the aid of gravitational force. At substantially the same vertical level as the separator zone Z, the air outlet space 1123 can be arranged to connect to that duct 108 via which the drive airflow is fed to the metering device 109. Alternatively, the air outlet space can, as shown, constitute part of the duct 108. As a further alternative, the air outlet space 1123 can connect to the duct 108 via a return duct (not shown). The separator 1' can be configured in accordance with the principles described with reference to FIGS. 1-2, but is here provided with a plurality of ribs 15', which are distributed around the material flow direction and form gaps 12' extending along the material flow direction. As can be seen from FIG. 9d, the separator 1' can be placed relative to the drive air duct 108 such that the inner limit face of the drive air duct 108 intersects or tangents an inner face of the separator 1'. The body which is defined by the ribs 15' can be slightly frustoconical. The ribs 15' can have a cross section which tapers in the material flow direction FM and the gaps 12' can thus have a gap width which increases in the material flow direction FM.

The separator 1, 1', comprising ribs 15, 15' and flanges 14, 14', 16, 16', can be formed in one piece, for example by casting of a separator 1, 1' of metal, or by injection moulding if the separator 1, 1' is to be made of polymer material. If the body defined by the ribs 15, 15' is slightly conical or frustoconical, this can facilitate removal of the separator 1, 1' from a forming tool. Configuration of the ribs 15, 15' with a cross section which tapers in the material flow direction FM can also facilitate removal of the separator from a forming tool.

In the material outlet flange 16' can be arranged axially continuous recesses 18', so that the ribs connect to the edge portion 13a' of the material outlet 13' via respective spacer parts 18'. The ribs 18' can thus connect to the edge portion 13a' of the material outlet 13 at a larger radius than that at which the ribs connect to the edge portion 11 a' of the material inlet 11'.

In addition, the separator can have a portion 19, which defines a part of the inlet space 1121. The portion 18 can be formed in one piece with the separator 1, 1'.

It will be appreciated that the herein shown separator and metering device can be used to dispense any chosen granular material within agriculture, such as seed, fertilizer or pesticide.

The invention claimed is:

1. Separator for separating seed, fertilizer, pesticide or other granular material, from a material-laden airflow, comprising:
   a separator zone having an inlet for a material-laden airflow, a material outlet and an air outlet; and
   at least two separator parts in the form of fixed ribs, which extend only substantially along a material flow in the separator zone and between which is formed a separator gap, which forms the air outlet, which is sufficiently narrow to allow air, but not the granular material, to pass through it,
   wherein the ribs extend between an inlet flange surrounding the inlet and an outlet flange surrounding the material outlet,
   wherein the separator parts together define a geometric body, which extends between the inlet and the material outlet, and which has a closed cross section, except for the separator gap,
   wherein, at the material outlet, the separator gap is at least partially open, viewed in a direction which is substantially parallel with the material flow, so that material which gets stuck in the separator gap is allowed to leave this by means of displacement principally along the material flow, wherein a distance between the separator parts increases along the material flow.

2. Separator according to claim 1, wherein the separator has a plurality of separator gaps, which are distributed radially around at least a part of the separator zone.

3. Separator for separating seed, fertilizer, pesticide or other granular material, from a material-laden airflow, comprising:
- a separator zone having an inlet for a material-laden airflow, a material outlet and an air outlet; and
- at least two separator parts in the form of fixed ribs, which extend only substantially along a material flow in the separator zone and between which is formed a separator gap, which forms the air outlet, which is sufficiently narrow to allow air, but not the granular material, to pass through it,
- wherein the separator parts together define a geometric body, which extends between the inlet and the material outlet,
- wherein, at the material outlet, the separator gap is at least partially open, viewed in a direction which is substantially parallel with the material flow, so that material which gets stuck in the separator gap is allowed to leave this by means of displacement principally along the material flow, wherein a distance between the separator parts increases along the material flow, wherein the separator comprises a base part situated at the material outlet and having a material outlet opening, the separator parts connecting to the edge of the material outlet opening at a greater radial distance from the centre of the opening than that at which the separator parts connect to the edge of an inlet opening.

4. Separator according to claim 1, wherein the separator parts span a substantially cylindrical, frustoconical, prism-shaped or frustum-shaped inner face.

5. Separator according to claim 2, wherein the separator parts connect to the edge of the material outlet opening via a substantially radially extending spacer portion.

6. Separator according to claim 3, wherein the base part has an axially continuous recess, which substantially coincides with the separator gap and extends radially beyond an inner face of the separator parts, and preferably past an outer face of the separator parts.

7. Separator according to claim 1, wherein the inlet is situated at a higher vertical level than the material outlet.

8. Metering device for metering and dispensing granular material, such as seed, fertilizer, or pesticide, comprising:
- a singling device configured to produce a flow of individual granules from the granular material, in which flow the granules are fed at a predefined mutual spacing; and
- a material inlet for feed-in of the granular material to the singling device,
- wherein a separator is arranged such that its inlet is connected to a feed duct for feeding a material-laden airflow and such that its material outlet is connected to the material inlet,
- the separator comprising:
- a separator zone having an inlet for a material-laden airflow, a material outlet and an air outlet; and
- at least two separator parts in the form of fixed ribs, which extend only substantially along a material flow in the separator zone and between which is formed a separator gap, which forms the air outlet, which is sufficiently narrow to allow air, but not the granular material, to pass through it,
- wherein the separator parts together define a geometric body, which extends between the inlet and the material outlet,
- wherein, at the material outlet, the separator gap is at least partially open, viewed in a direction which is substantially parallel with the material flow, so that material which gets stuck in the separator gap is allowed to leave this by means of displacement principally along the material flow, wherein a distance between the separator parts increases along the material flow.

9. Metering device according to claim 8, wherein the air outlet of the separator is connected to a duct for pressurization of the singling device, so that airflow from the separator is connected to an air inlet of the metering device.

10. Metering device according to claim 9, wherein the air inlet and the material inlet are connected to the metering device on a high-pressure side of a singling disc.

11. Agricultural implement for distributing granular material, such as seed, fertilizer or pesticide, comprising:
- a central container for the granular material;
- at least two metering devices according to claim 10; and
- at least two feed ducts for feeding the granular material from the central container to the respective metering device.

12. Method for, in an agricultural implement, separating seed, fertilizer, pesticide, or granular material from a material-laden air stream, which method comprises:
- introducing the material-laden air stream into a separator zone, defined by fixed separator ribs to form a geometric body, which extends between an inlet and a material outlet,
- passing the granular material through the separator zone along a separator gap between the ribs, which, at a material outlet, is at least partially open in a direction which is substantially parallel with a material flow, so that material which gets stuck in the separator gap is allowed to leave this by means of displacement principally along the separator gap, wherein a size of the separator gap increases along the material flow, and
- feeding the granular material separated from the material-laden air stream to a metering device.

13. Metering device according to claim 9, wherein the air inlet and the material inlet are connected to the metering device on a high-pressure side of a singling disc.

14. Separator for separating granular material, such as seed, fertilizer or pesticide, from a material-laden airflow, comprising:
- a separator zone having an inlet for a material-laden airflow, a material outlet and an air outlet; and
- at least two separator parts, which extend only substantially along a material flow in the separator zone and between which is formed a separator gap, which is sufficiently narrow to allow air, but not the granular material, to pass through it, wherein the separator gap forms the air outlet,
- in that, at the material outlet, the separator gap is at least partially open, viewed in a direction which is substantially parallel with the material flow, so that material which gets stuck in the separator gap is allowed to leave this by means of displacement principally along the material flow,
- wherein the separator comprises a base part situated at the material outlet and having a material outlet opening, the separator parts connecting to the edge of the material outlet opening at a greater radial distance from the centre of the opening than that at which the separator parts connect to the edge of an inlet opening.

15. Separator for separating granular material, such as seed, fertilizer or pesticide, from a material-laden airflow, comprising:
- a separator zone having an inlet for a material-laden airflow, a material outlet and an air outlet; and at least two separator parts, in the form of fixed ribs, which extend only substantially along a material flow in the separator zone and between which is formed a separator gap, which forms the air outlet, which is sufficiently narrow to allow air, but not the granular material, to pass through it, wherein, at the material outlet, the separator gap is at least partially open, viewed in a direction which is substantially parallel with the material flow, so that material which gets stuck in the separator gap is allowed to leave this by means of displacement principally along the material flow, wherein the separator has a plurality of separator gaps, which are distributed radially around at least a part of the separator zone, and wherein the separator parts connect to an edge of the material outlet opening via a substantially radially extending spacer portion, wherein the ribs extend between an inlet flange surrounding the inlet and an outlet flange surrounding the material outlet and wherein the separator parts together define a geometric body, which extends between the inlet and the material outlet, and which has a closed cross section, except for the separator gaps.

* * * * *